United States Patent
Lee et al.

(10) Patent No.: US 11,636,690 B2
(45) Date of Patent: Apr. 25, 2023

(54) ENVIRONMENT PERCEPTION DEVICE AND METHOD OF MOBILE VEHICLE

(71) Applicant: Metal Industries Research & Development Centre, Kaohsiung (TW)

(72) Inventors: Tsung Han Lee, Yunlin County (TW); Jinn-Feng Jiang, New Taipei (TW); Shih-Chun Hsu, Miaoli County (TW); Tsu-Kun Chang, New Taipei (TW); Hung-Yuan Wei, New Taipei (TW); Cheng-Tai Lei, Taipei (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 0 days.

(21) Appl. No.: 17/195,583

(22) Filed: Mar. 8, 2021

(65) Prior Publication Data
US 2022/0171976 A1    Jun. 2, 2022

(30) Foreign Application Priority Data

Nov. 30, 2020   (TW) ................................. 109142067

(51) Int. Cl.
*G06K 9/00*    (2022.01)
*B60W 30/095*   (2012.01)
(Continued)

(52) U.S. Cl.
CPC ......... *G06V 20/58* (2022.01); *B60W 30/0956* (2013.01); *B60W 50/14* (2013.01);
(Continued)

(58) Field of Classification Search
None
See application file for complete search history.

(56) References Cited

U.S. PATENT DOCUMENTS 7,243,026 B2    7/2007   Kudo
8,886,387 B1 *  11/2014  Agarwal ............... G06V 20/56
                                                        701/28
(Continued)

FOREIGN PATENT DOCUMENTS

CN    102145688    8/2011
CN    104899855    9/2015
(Continued)

OTHER PUBLICATIONS

"Office Action of Taiwan Counterpart Application", dated Sep. 13, 2021, p. 1-p. 5.
(Continued)

*Primary Examiner* — Edemio Navas, Jr.
(74) *Attorney, Agent, or Firm* — JCIPRNET

(57) ABSTRACT

The disclosure provides an environment perception device and method of a mobile vehicle. The environment perception device includes a camera module, a LiDAR module, a database and a processing circuit. The camera module photographs a field near the mobile vehicle to generate a three-dimensional (3D) image frame. The LiDAR module scans the field to generate a 3D scanned frame. The processing circuit fuses the 3D image frame and the 3D scanned frame to generate 3D object information. The processing circuit compares the 3D object information with a 3D map in the database to determine whether an object is a static object. The processing circuit performs an analysis and calculation on the 3D object information to obtain movement characteristics of the object when the object is not the static object, and skips the analysis and calculation on the 3D object information when the object is the static object.

12 Claims, 2 Drawing Sheets

(51) Int. Cl.
| | |
|---|---|
| *B60W 50/14* | (2020.01) |
| *G01B 11/22* | (2006.01) |
| *G01S 17/89* | (2020.01) |
| *G01S 17/931* | (2020.01) |
| *G06K 9/62* | (2022.01) |
| *G06T 7/11* | (2017.01) |
| *G06T 7/13* | (2017.01) |
| *G06T 7/20* | (2017.01) |
| *H04N 13/204* | (2018.01) |
| *G06V 20/58* | (2022.01) |
| *G06V 20/64* | (2022.01) |

(52) U.S. Cl.
CPC .............. *G01B 11/22* (2013.01); *G01S 17/89* (2013.01); *G01S 17/931* (2020.01); *G06K 9/6201* (2013.01); *G06K 9/6288* (2013.01); *G06T 7/11* (2017.01); *G06T 7/13* (2017.01); *G06T 7/20* (2013.01); *G06V 20/64* (2022.01); *H04N 13/204* (2018.05); *B60W 2050/143* (2013.01); *B60W 2420/42* (2013.01); *B60W 2420/52* (2013.01); *B60W 2554/20* (2020.02); *B60W 2554/4041* (2020.02); *B60W 2554/4042* (2020.02); *B60W 2554/4044* (2020.02); *B60W 2554/80* (2020.02); *G06T 2207/10028* (2013.01); *G06T 2207/20221* (2013.01)

(56) References Cited

U.S. PATENT DOCUMENTS

| | | | | |
|---|---|---|---|---|
| 11,024,055 | B2* | 6/2021 | Hsu | ........................ G01S 17/931 |
| 2013/0107050 | A1* | 5/2013 | Maruoka | ................ G08G 1/166 |
| | | | | 348/148 |
| 2014/0005886 | A1 | 1/2014 | Morris et al. | |
| 2019/0004178 | A1 | 1/2019 | Motoyama et al. | |
| 2019/0311546 | A1* | 10/2019 | Tay | ........................... G06T 5/50 |
| 2020/0025935 | A1 | 1/2020 | Liang et al. | |
| 2020/0175720 | A1 | 6/2020 | Hsu et al. | |

FOREIGN PATENT DOCUMENTS

| | | |
|---|---|---|
| CN | 105313782 | 2/2016 |
| CN | 205010095 | 2/2016 |
| TW | I332453 | 11/2010 |
| TW | M490591 | 11/2014 |
| TW | 201638833 | 11/2016 |
| TW | 201835603 | 10/2018 |
| TW | M578804 | 6/2019 |
| TW | 202014993 | 4/2020 |
| TW | 202020734 | 6/2020 |

OTHER PUBLICATIONS

François Pomerleau et al., "Long-term 3D map maintenance in dynamic environments", IEEE International Conference on Robotics And Automation (ICRA), Jun. 2014, pp. 3712-3719.

B. Ravi Kiran et al., "Real-Time Dynamic Object Detection for Autonomous Driving Using Prior 3D-Maps", Computer Vision—ECCV 2018 Workshops, Jan. 2019, pp. 567-582.

Cholakkal Hafeez Husain et al., "LiDAR—Stereo Camera Fusion for Accurate Depth Estimation", 2020 AEIT International Conference of Electrical and Electronic Technologies for Automotive (AEIT Automotive), Nov. 2020, pp. 1-6.

"Office Action of U.K. Counterpart Application", dated Jun. 8, 2022, pp. 1-11.

Kihong Park et al., "High-precision Depth Estimation with the 3D LiDAR and Stereo Fusion", 2018 IEEE International Conference on Robotics and Automation (ICRA), May 2018, p. 1-p. 8.

"Written Opinion and Search Report of Singapore Counterpart Application", dated Dec. 22, 2022, p. 1-p. 11.

* cited by examiner

ENVIRONMENT PERCEPTION DEVICE AND METHOD OF MOBILE VEHICLE

CROSS-REFERENCE TO RELATED APPLICATION

This application claims the priority benefit of Taiwan application serial no. 109142067, filed on Nov. 30, 2020. The entirety of the above-mentioned patent application is hereby incorporated by reference herein and made a part of this specification.

BACKGROUND

Technical Field

The disclosure relates to a mobile vehicle, and more particularly to an environment perception device and method.

Description of Related Art

When a mobile vehicle (such as a car) is traveling on a road, the mobile vehicle needs to perceive obstacles in the environment, including static objects and dynamic objects (moving objects). For example, when there is an object near the rear of the car, the reversing radar will make an alarm sound. The conventional technology determines only the distance between the object and the mobile vehicle, and cannot effectively recognize the outline of the nearby object, and thus cannot distinguish what the object actually is. When the mobile vehicle is surrounded by unthreatening objects such as grass, the conventional technology still makes alarm sounds and even triggers automatic brakes, which causes unnecessary trouble. Environment perception is one of the important technical issues in the technical field of mobile vehicles.

SUMMARY

The disclosure provides an environment perception device and an environment perception method of a mobile vehicle, which combine the characteristics of a camera module and the characteristics of a LiDAR module to perform environment perception.

In an embodiment of the disclosure, the above environment perception device includes a camera module, a LiDAR module, a database and a processing circuit. The camera module and the LiDAR module are disposed on the mobile vehicle. The camera module is configured to photograph a field near the mobile vehicle to generate a three-dimensional (3D) image frame. The LiDAR module is configured to scan the field to generate a 3D scanned frame. The database is configured to store a 3D map. The processing circuit is coupled to the camera module and the LiDAR module to receive the 3D image frame and the 3D scanned frame. The processing circuit is configured to fuse the 3D image frame and the 3D scanned frame to generate 3D object information corresponding to an object in the field. The processing circuit compares the 3D object information with the 3D map to determine whether the object is a static object. In a case where the object is not the static object or in a case where the object has not been recorded in the 3D map, the processing circuit performs an analysis and calculation on the 3D object information to obtain a movement characteristic of the object. In a case where the object is the static object, the processing circuit skips the analysis and calculation on the 3D object information.

In an embodiment of the disclosure, the above environment perception method includes: photographing a field near the mobile vehicle by a camera module disposed on the mobile vehicle to generate a three-dimensional (3D) image frame; scanning the field by a LiDAR module disposed on the mobile vehicle to generate a 3D scanned frame; fusing the 3D image frame and the 3D scanned frame by a processing circuit to generate 3D object information corresponding to an object in the field; comparing the 3D object information with a 3D map stored in a database by the processing circuit to determine whether the object is a static object; in a case where the object is not the static object or in a case where the object has not been recorded in the 3D map, performing an analysis and calculation on the 3D object information by the processing circuit to obtain a movement characteristic of the object; and in a case where the object is the static object, skipping the analysis and calculation on the 3D object information by the processing circuit.

Based on the above, the environment perception device described in the above embodiments is provided with the camera module and the LiDAR module. The processing circuit may fuse the 3D information of the 3D image frame of the camera module and the 3D information of the 3D scanned frame of the LiDAR module to generate the 3D object information corresponding to a certain object in the field. Therefore, the processing circuit may integrate the characteristics of the camera module and the LiDAR module to perform environment perception. In some embodiments, the processing circuit may compare the 3D object information with the 3D map stored in the database. In the case where the 3D object information has not been analyzed (that is, the 3D object information has not been recorded in the database), the processing circuit may perform the analysis and calculation on the 3D object information to obtain the movement characteristics of the object. Then, the 3D object information and the analysis and calculation results are recorded in the database to construct a 3D map. A moving object (a person or a car) generally does not belong to a static object in the 3D map. Therefore, the processing circuit may perform the analysis and calculation on the moving object to obtain the movement characteristics of the object. In the case where the object is the static object, the processing circuit may skip the analysis and calculation on the static object that has been analyzed to reduce the repetition of calculation.

In order to make the aforementioned features and advantages of the disclosure comprehensible, embodiments accompanied with drawings are described in detail below.

DESCRIPTION OF THE EMBODIMENTS

Figure 1:
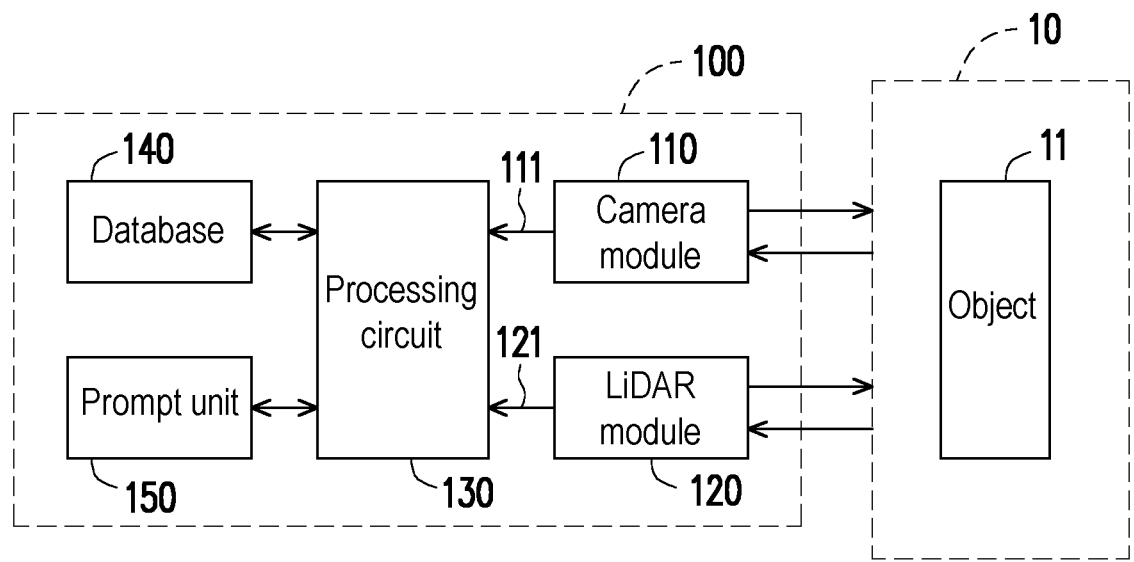
FIG. 1 is a schematic diagram of a circuit block of an environment perception device according to an embodiment of the disclosure.

The term "coupling (or connection)" used throughout the specification (including the claims) may refer to any direct or indirect connection method. For example, if it is described that a first device is coupled (or connected) to a second device, it should be interpreted that the first device can be directly connected to the second device, or the first device can be indirectly connected to the second device through other devices or a certain connection method. The terms "first," "second" and the like mentioned throughout the specification (including the claims) are used only to name the elements or to distinguish different embodiments or scopes; they are not intended to limit the upper or lower limit of the number of the elements, and are not used to limit the order of the elements, either. In addition, wherever possible, elements/components/steps denoted by the same reference numerals in the drawings and embodiments represent the same or similar parts. It is possible to refer to related descriptions for elements/components/steps denoted by the same reference numerals or the same terms in different embodiments.

FIG. 1 is a schematic diagram of a circuit block of an environment perception device 100 according to an embodiment of the disclosure. The environment perception device 100 may be disposed in a mobile vehicle (such as a car, not shown) to perceive the environment of the mobile vehicle. The environment perception device 100 shown in FIG. 1 includes a camera module 110, a LiDAR module 120, a processing circuit 130, a database 140, and a prompt unit 150. The camera module 110 and the LiDAR module 120 are disposed on the mobile vehicle. The camera module 110 is configured to photograph a field 10 near the mobile vehicle to generate a three-dimensional (3D) image frame 111. The LiDAR module 120 is configured to scan the field 10 to generate a 3D scanned frame 121. In the example shown in FIG. 1, an object 11 is in the field 10. The processing circuit 130 is coupled to the camera module 110 and the LiDAR module 120 to receive the 3D image frame 111 and the 3D scanned frame 121.

Figure 2:
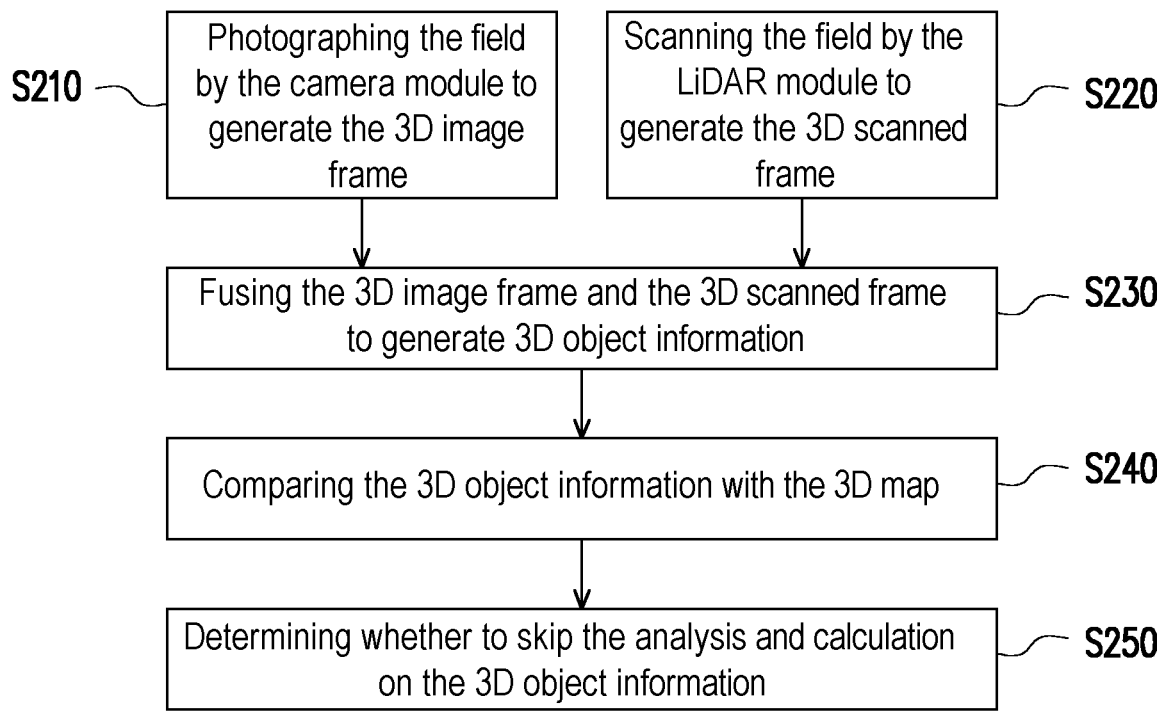
FIG. 2 is a schematic flowchart of an environment perception method according to an embodiment of the disclosure.

FIG. 2 is a schematic flowchart of an environment perception method according to an embodiment of the disclosure. Please refer to FIG. 1 and FIG. 2. In step S210, the camera module 110 disposed on the mobile vehicle (such as a car, not shown) may photograph the field 10 near the mobile vehicle to generate the 3D image frame 111. The implementation of the camera module 110 may be determined according to design requirements. For example, in some embodiments, the camera module 110 may include a depth camera (not shown), and the 3D image frame 111 may include a depth image frame. The camera module 110 may detect whether there are objects that may influence driving safety in the space (field 10) within tens of meters around the mobile vehicle, such as pedestrians, animals, cars, scooters and/or other moving objects, or fixed fences, bushes, and the like.

In other embodiments, the camera module 110 may include two color cameras (not shown), one infrared (IR) camera (not shown), and two IR light sources (not shown). If there are other objects (such as the object 11) around the mobile vehicle, the light from the IR light sources will be cast on the surface of the object 11. The reflected light from the object 11 is received by the camera to generate the 3D image frame 111.

In step S220, the LiDAR module 120 disposed on the mobile vehicle (such as a car, not shown) may scan the field 10 to generate the 3D scan frame 121. A laser light source of the LiDAR module 120 may irradiate a light beam (such as a pulsed laser beam) to the field 10 to measure parameters such as the distance of the target (such as the object 11). The laser light source of the LiDAR module 120 has the characteristics of good coherence, slow attenuation, long measurement distance, and high accuracy. In addition, the laser light source is less likely to be influenced by other light sources, so it is better than general light projection. Based on the 3D information of the 3D scanned frame 121 of the LiDAR module 120, the environment perception device 100 may estimate the dynamic behaviors (such as the movement speed, the acceleration, and the directionality) of various objects within a 200-meter radius of the mobile vehicle in advance.

In step S230, the processing circuit 130 of the environment perception device 100 may fuse the 3D image frame 111 and the 3D scanned frame 121 to generate 3D object information corresponding to the object 11 in the field 10. Generally speaking, compared with the camera module 110, the LiDAR module 120 has a poorer performance in foggy places. Compared with the LiDAR module 120, the camera module 110 has a poorer performance in dark places and/or backlit places. The environment perception device 100 may integrate the characteristics of the camera module 110 and the characteristics of the LiDAR module 120. Therefore, the environment perception device 100 may not be influenced by the day and night environments, thereby improving the recognition accuracy to enhance driving safety.

The database 140 is configured to store a 3D map. In step S240, the processing circuit 130 may compare the 3D object information corresponding to the object 11 with the 3D map stored in the database 140. Based on the comparison result of step S240, the processing circuit 130 may determine in step S250 whether to skip the analysis and calculation on the 3D object information. For example, in the case where the 3D object information has not been analyzed (that is, the object 11 has not been recorded in the 3D map of the database), the processing circuit 130 may perform an analysis and calculation on the 3D object information to obtain the movement characteristics of the object 11. Then, the 3D object information and the analysis and calculation results are recorded in the database 140 to construct a 3D map.

That "the processing circuit 130 may find the object 11 in the 3D map" means that the location of the object 11 in the field 10 detected by the environment perception device 100 in an earlier time is the same as the location of the object 11 in the field 10 detected by the environment perception device 100 in the current time. That is, the object 11 is a static object in the field 10. Therefore, the processing circuit 130 may compare the 3D object information corresponding to the object 11 with the 3D map stored in the database 140 in step S240 to determine whether the object 11 is a static object. In the case where the object 11 is not the static object, the processing circuit 130 may perform the analysis and calculation on the 3D object information in step S250 to obtain the movement characteristics of the object 11. According to design requirements, the movement characteristics include at least one of a size, a position, a distance, a speed, an acceleration, and a direction of the object 11. The embodiment does not limit the computing details of the analysis and calculation on the movement characteristics. For example, in some embodiments, the analysis and calculation may include a conventional calculation method of object movement characteristics or other analyses and calculations. In the case where the object 11 is the static object, the processing circuit 130 may skip the analysis and calculation on the 3D object information in step S250.

There are different types of objects near the mobile vehicle, and different types of objects have different degrees of influence on the driving safety. For example, the object 11 (such as a vehicle or a pedestrian) may collide with the mobile vehicle in a short time. When the object 11 is a lot of grass, that "the mobile vehicle hits the object 11" is actually not a dangerous thing. The processing circuit 130 may classify the 3D object information corresponding to the object 11 to determine whether the object 11 poses a threat to the mobile vehicle. The classification method may use the appearance characteristics of different objects for recognition. The processing circuit 130 may compare the characteristics of the object 11 with data stored in advance in the database 140. The database 140 may be a storage module coupled to the processing circuit 130. In other embodiments, the database 140 may be a cloud database. After classification, the processing circuit 130 may determine whether the object 11 influences the safety of the mobile vehicle. For example, when the object 11 is grass that is not dangerous to driving safety, the processing circuit 130 may ignore the object 11. The "ignorance" means that no computing resources are consumed to estimate the movement trend of the object 11 (the collision possibility between the object 11 and the mobile vehicle).

On the contrary, if the object 11 is classified as something that will influence the safety of the mobile vehicle, the processing circuit 130 may perform the analysis and calculation to obtain the movement trend of the object 11 based on the movement characteristic. The processing circuit 130 may use the movement information of the mobile vehicle itself (including information such as the movement speed and the direction) and the movement information of the object 11 (the movement characteristics, including information such as the movement speed and the direction) to estimate the collision possibility between the object 11 and the mobile vehicle. If the estimation result shows that there is a possibility of collision between the object 11 and the mobile vehicle, the processing circuit 130 may drive the prompt unit 150 to trigger an obstacle alarm, so that the driver may learn the existence of the crisis.

The processing circuit 130 may determine whether to drive the prompt unit 150 to trigger an obstacle alarm based on the movement trend. For example, when the movement trend of the object 11 indicates that "the mobile vehicle will collide with the object 11," the processing circuit 130 may trigger an obstacle alarm. For example, when the distance from the mobile vehicle (such as a car, not shown) to the obstacle (the object 11) is less than 100 meters and the object 11 and the mobile vehicle move in parallel, the processing circuit 130 may mark the obstacle on a screen of a display panel (the prompt unit 150). When the distance from the mobile vehicle to the obstacle (the object 11) is less than 10 meters and the movement trend of the object 11 is "approaching the mobile vehicle," the processing circuit 130 may mark the obstacle on the screen of the display panel (the prompt unit 150) and drive the horn (the prompt unit 150) to make an alarm sound. When the distance from the mobile vehicle to the obstacle (the object 11) is less than 5 meters and the movement trend of the object 11 is "moving parallel to the mobile vehicle," the processing circuit 130 may mark the obstacle on the screen of the display panel (the prompt unit 150) and drive the horn (the prompt unit 150) to make intermittent alarm sounds. When the distance from the mobile vehicle to the obstacle (the object 11) is less than 2 meters and the movement trend of the object 11 is "approaching the mobile vehicle," the processing circuit 130 may mark the obstacle on the screen of the display panel (the prompt unit 150) and drive the horn (the prompt unit 150) to make continuous alarm sounds. In addition, if the mobile vehicle is automatically driven by a computer, the processing circuit 130 may trigger a corresponding avoidance mechanism to prevent the mobile vehicle from colliding with the object 11.

This embodiment mainly generates 3D environment information through depth image environment scanning and image fusion for high-accuracy 3D scan recognition. By establishing the 3D map for repeated paths, the embodiment may be applied to complex and crowded urban environments and accurately provide obstacle avoidance alarms. Based on the fusion of the 3D image frame 111 and the 3D scanned frame 121, the embodiment may be applied to the whole environment and is not easily influenced by environmental noise, thereby improving the recognition accuracy.

Figure 3:
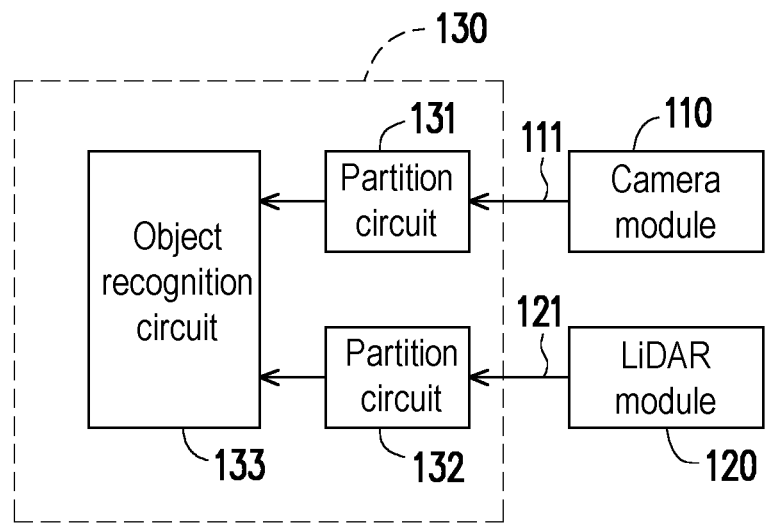
FIG. 3 is a schematic diagram illustrating a circuit block of the processing circuit shown in FIG. 1 according to an embodiment of the disclosure.

FIG. 3 is a schematic diagram illustrating a circuit block of the processing circuit 130 shown in FIG. 1 according to an embodiment of the disclosure. For the camera module 110, the LiDAR module 120, and the processing circuit 130 shown in FIG. 3, please refer to the related descriptions of the camera module 110, the LiDAR module 120, and the processing circuit 130 shown in FIG. 1, and thus their descriptions will be omitted here. In the embodiment shown in FIG. 3, the processing circuit 130 includes a partition circuit 131, a partition circuit 132, and an object recognition circuit 133. The partition circuit 131 is coupled to the camera module 110 to receive the 3D image frame 111. The partition circuit 132 is coupled to the LiDAR module 120 to receive the 3D scanned frame 121.

Figure 4:
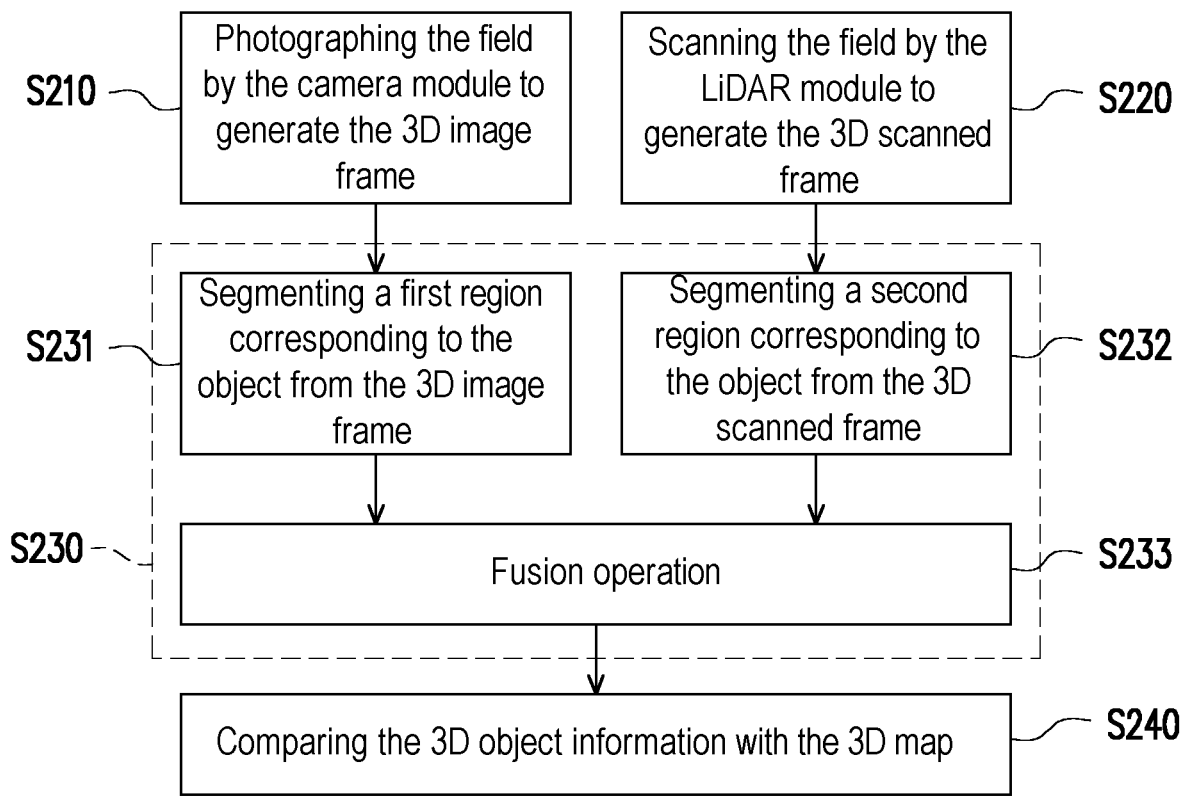
FIG. 4 is a schematic flowchart of an environment perception method according to another embodiment of the disclosure.

FIG. 4 is a schematic flowchart of an environment perception method according to another embodiment of the disclosure. For steps S210, S220, S230, and S240 shown in FIG. 4, please refer to the related descriptions of steps S210, S220, S230, and S240 shown in FIG. 2, and thus their descriptions will be omitted here. In the embodiment shown in FIG. 4, step S230 includes steps S231, S232, and S233. Please refer to FIG. 3 and FIG. 4. In step S231, the partition circuit 131 may perform a first algorithm to segment a first region corresponding to the object 11 from the 3D image frame 111. The embodiment does not limit the implementation details of the first algorithm. For example, the partition circuit 131 may perform a maximally stable extremal regions (MSER) algorithm (the first algorithm) to segment the first region corresponding to the object 11 from the 3D image frame 111. In step S232, the partition circuit 132 may perform a second algorithm to segment a second region corresponding to the object 11 from the 3D scanned frame 121. The embodiment does not limit the implementation details of the second algorithm. For example, the partition circuit 132 may perform a maximally stable color regions (MSCR) algorithm (the second algorithm) to segment the second region corresponding to the object 11 from the 3D scanned frame 121.

The object recognition circuit 133 is coupled to the partition circuit 131 and the partition circuit 132. In step S233, the object recognition circuit 133 may perform a fusion operation to fuse the first region and the second region that match each other into the 3D object information corresponding to the object 11. In some embodiments, the fusion operation may include an edge detection algorithm. The edge detection algorithm may process the first region and the second region to generate the first region after edge detection and the second region after edge detection. For example, the object recognition circuit 133 may perform Sobel edge detection to fuse the 3D image frame 111 and the 3D scanned frame 121. According to design requirements, the object recognition circuit 133 may use a maximum entropy Markov model (MEMM) to fuse the 3D image frame 111 and the 3D scanned frame 121 to obtain the 3D object information corresponding to the object 11. The object recognition circuit 133 may compare the 3D object information with the 3D map to determine whether the object 11 is the static object. In the case where the object 11 is not the static object, the object recognition circuit 133 may perform the analysis and calculation on the 3D object information. In the case where the object 11 is the static object, the object recognition circuit 133 may skip the analysis and calculation on the 3D object information.

According to different design requirements, the processing circuit 130, the partition circuit 131, the partition circuit 132, and/or the object recognition circuit 133 may be implemented as hardware, firmware, or software (that is, a program) or a combination of more of the above three.

In terms of hardware implementation, the processing circuit 130, the partition circuit 131, the partition circuit 132, and/or the object recognition circuit 133 may be implemented in a logic circuit on an integrated circuit. The related functions of the processing circuit 130, the partition circuit 131, the partition circuit 132, and/or the object recognition circuit 133 may be implemented as hardware using hardware description languages (such as Verilog HDL or VHDL) or other suitable programming languages. For example, the related functions of the processing circuit 130, the partition circuit 131, the partition circuit 132, and/or the object recognition circuit 133 may be implemented in one or more controllers, microcontrollers, microprocessors, application-specific integrated circuits (ASICs), digital signal processors (DSPs), field programmable gate arrays (FPGAs), and/or various logic blocks, modules and circuits in other processing units.

In terms of software and/or firmware implementation, the related functions of the processing circuit 130, the partition circuit 131, the partition circuit 132, and/or the object recognition circuit 133 may be implemented as programming code. For example, general programming languages (such as C, C++ or assembly languages) or other suitable programming languages are used to implement the processing circuit 130, the partition circuit 131, the partition circuit 132, and/or the object recognition circuit 133. The programming code may be recorded/stored in a recording medium. In some embodiments, the recording medium includes, for example, a read only memory (ROM), a random access memory (RAM), and/or a storage device. The storage device includes a hard disk drive (HDD), a solid-state drive (SSD) or other storage devices. In other embodiments, the recording medium may include a "non-transitory computer readable medium." For example, a tape, a disk, a card, semiconductor memory, a programmable logic circuit and the like may be used to implement the non-transitory computer readable medium. A computer, a central processing unit (CPU), a controller, a microcontroller, or a microprocessor may read and execute the programming code from the recording medium, thereby realizing the related functions of the processing circuit 130, the partition circuit 131, the partition circuit 132, and/or the object recognition circuit 133. Moreover, the programming code may be provided to the computer (or the CPU) via any transmission medium (a communication network, a radio wave, or the like). The communication network is, for example, the Internet, a wired communication network, a wireless communication network, or other communication media.

In summary, the environment perception device 100 described in the above embodiments is provided with the camera module 110 and the LiDAR module 120. The processing circuit 130 may fuse the 3D information of the 3D image frame 111 of the camera module 110 and the 3D information of the 3D scanned frame 121 of the LiDAR module 120 to generate the 3D object information corresponding to a certain object 11 in the field 10. Therefore, the processing circuit 130 may integrate the characteristics of the camera module 110 and the LiDAR module 120 to perform environment perception. In some embodiments, the processing circuit 130 may compare the 3D object information with the 3D map stored in the database 140. In the case where the 3D object information has not been analyzed (that is, the 3D object information has not been recorded in the database 140), the processing circuit 130 may perform the analysis and calculation on the 3D object information to obtain the movement characteristics of the object 11. Then, the 3D object information and the analysis and calculation results are recorded in the database 140 to construct a 3D map. A moving object (a person or a car) generally does not belong to a static object in the 3D map. Therefore, the processing circuit 130 may perform the analysis and calculation on the moving object to obtain the movement characteristics of the object. In the case where the object 11 is the static object, the processing circuit may skip the analysis and calculation on the static object 11 that has been analyzed to reduce the repetition of calculation.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An environment perception device of a mobile vehicle, comprising:
    a camera module disposed on the mobile vehicle and configured to photograph a field near the mobile vehicle to generate a three-dimensional (3D) image frame;
    a LiDAR module disposed on the mobile vehicle and configured to scan the field to generate a 3D scanned frame;
    a database configured to store a 3D map; and
    a processing circuit coupled to the camera module and the LiDAR module to receive the 3D image frame and the 3D scanned frame,
    wherein the processing circuit is configured to fuse the 3D image frame of the camera module and the 3D scanned frame of the LiDAR module to generate a specific 3D object information corresponding to an object in the field,
    wherein the processing circuit is configured to determine whether the object in the field is a static object by comparing the specific 3D object information with the 3map, wherein the specific 3D object information is not retrieved from a two-dimensional sensing data corresponding to the object in the field,
    in response to that the object in the field is a moving object or the object in the field has not been recorded in the 3D map, the processing circuit performs an analysis and calculation on the specific 3D object information to obtain a movement characteristic including a moving direction of the object and a size of the object, and
    in response to that the object in the field is the static object, the processing circuit skips the analysis and calculation on the specific 3D object information.

2. The environment perception device according to claim 1, wherein the camera module comprises a depth camera, and the 3D image frame comprises a depth image frame.

3. The environment perception device according to claim 1, wherein the processing circuit comprises:
a first partition circuit coupled to the camera module to receive the 3D image frame, wherein the first partition circuit is configured to perform a first algorithm to segment a first region corresponding to the object from the 3D image frame;
a second partition circuit coupled to the LiDAR module to receive the 3D scanned frame, wherein the second partition circuit is configured to perform a second algorithm to segment a second region corresponding to the object from the 3D scanned frame; and
an object recognition circuit coupled to the first partition circuit and the second partition circuit,
wherein the object recognition circuit performs a fusion operation to fuse the first region and the second region that match each other into the specific 3D object information,
wherein the object recognition circuit compares the specific 3D object information with the 3D map to determine whether the object in the field is the static object,
in response to that the object in the field is the moving object, the object recognition circuit performs the analysis and calculation on the specific 3D object information, and
in response to that the object in the field is the static object, the object recognition circuit skips the analysis and calculation on the specific 3D object information.

4. The environment perception device according to claim 3, wherein the fusion operation comprises an edge detection algorithm, and the edge detection algorithm is configured to process the first region and the second region to generate the first region after edge detection and the second region after edge detection.

5. The environment perception device according to claim 1, wherein the movement characteristic further comprises at least one of a position, a distance, a speed, and an acceleration.

6. The environment perception device according to claim 1, wherein the analysis and calculation further obtains a movement trend of the object based on the movement characteristic, and the processing circuit further determines whether to trigger an obstacle alarm based on the movement trend.

7. An environment perception method of a mobile vehicle, comprising:
photographing a field near the mobile vehicle by a camera module disposed on the mobile vehicle to generate a three-dimensional (3D) image frame;
scanning the field by a LiDAR module disposed on the mobile vehicle to generate a 3D scanned frame;
fusing the 3D image frame of the camera module and the 3D scanned frame of the LiDAR module by a processing circuit to generate a specific 3D object information corresponding to an object in the field;
using the processing circuit to determine whether the object in the field is a static object by comparing the specific 3D object information with a 3D map stored in a database, wherein the specific 3D object information is not retrieved from a two-dimensional sensing data corresponding to the object in the field;
in response to that the object in the field is a moving object or the object has not been recorded in the 3D map, performing an analysis and calculation on the specific 3D object information by the processing circuit to obtain a movement characteristic including a moving direction of the object and a size of the object; and
in response to that the object in the field is the static object, skipping the analysis and calculation on the specific 3D object information by the processing circuit.

8. The environment perception method according to claim 7, wherein the camera module comprises a depth camera, and the 3D image frame comprises a depth image frame.

9. The environment perception method according to claim 7, further comprising:
performing a first algorithm by a first partition circuit of the processing circuit to segment a first region corresponding to the object from the 3D image frame;
performing a second algorithm by a second partition circuit of the processing circuit to segment a second region corresponding to the object from the 3D scanned frame;
performing a fusion operation by an object recognition circuit of the processing circuit to fuse the first region and the second region that match each other into the specific 3D object information;
comparing the specific 3D object information with the 3D map by the object recognition circuit to determine whether the object in the field is the static object;
in response to that the object in the field is the moving object, performing the analysis and calculation on the specific 3D object information by the object recognition circuit; and
in response to that the object in the field is the static object, skipping the analysis and calculation on the specific 3D object information by the object recognition circuit.

10. The environment perception method according to claim 9, wherein the fusion operation comprises an edge detection algorithm, and the edge detection algorithm is configured to process the first region and the second region to generate the first region after edge detection and the second region after edge detection.

11. The environment perception method according to claim 7, wherein the movement characteristic further comprises at least one of a position, a distance, a speed, and an acceleration.

12. The environment perception method according to claim 7, further comprising:
performing the analysis and calculation by the processing circuit to obtain a movement trend of the object based on the movement characteristic; and
determining by the processing circuit whether to trigger an obstacle alarm based on the movement trend.

* * * * *